(12) United States Patent
Harper

(10) Patent No.: US 10,651,565 B1
(45) Date of Patent: May 12, 2020

(54) ANTENNA POLARIZATION DIVERSITY

(71) Applicant: Microsoft Technology Licensing, LLC, Redmond, WA (US)

(72) Inventor: Marc Harper, Snohomish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 16/397,329

(22) Filed: Apr. 29, 2019

(51) Int. Cl.
| | |
|---|---|
| *H01Q 21/24* | (2006.01) |
| *H01Q 21/06* | (2006.01) |
| *H04B 7/10* | (2017.01) |
| *H04B 7/0413* | (2017.01) |

(52) U.S. Cl.
CPC ......... *H01Q 21/061* (2013.01); *H01Q 21/245* (2013.01); *H04B 7/0413* (2013.01); *H04B 7/10* (2013.01)

(58) Field of Classification Search
CPC ...................................................... H01Q 21/24
See application file for complete search history.

(56) References Cited

U.S. PATENT DOCUMENTS

| | | | |
|---|---|---|---|
| 6,031,503 A | 2/2000 | Preis et al. | |
| 7,477,201 B1* | 1/2009 | Bit-Babik | ................ H01Q 5/00 343/700 MS |
| 7,932,867 B2 | 4/2011 | Tuttle | |
| 8,593,360 B2 | 11/2013 | Baliarda et al. | |
| 9,077,071 B2 | 7/2015 | Shtrom et al. | |
| 2005/0140551 A1* | 6/2005 | Kaluzni | ................... H01Q 1/22 343/700 MS |
| 2006/0114159 A1* | 6/2006 | Yoshikawa | .............. H01Q 1/24 343/702 |

(Continued)

FOREIGN PATENT DOCUMENTS

| | | |
|---|---|---|
| CN | 105896048 A | 8/2016 |
| EP | 1869726 A1 | 12/2007 |

OTHER PUBLICATIONS

Row, et al., "Design of Polarization Diversity Patch Antenna Based on a Compact Reconfigurable Feeding Network", In Journal of IEEE Transactions on Antennas and Propagation, vol. 62, Issue 10, Oct. 1, 2014, pp. 5349-5352.

*Primary Examiner* — David Bilodeau
(74) *Attorney, Agent, or Firm* — Holzer Patel Drennan

(57) ABSTRACT

Antenna polarization diversity enhances the MIMO performance of multiple antennas, especially when the multiple antennas do not exhibit significant placement diversity. An antenna assembly provides selectable antenna polarization in the antenna assembly on a ground plane. An antenna element of the antenna assembly drives a first electrical configuration with a radiofrequency signal to radiate with a polarization predominately in a first direction of propagation. The antenna assembly is selectively modified from the first electrical configuration to a second electrical configuration, responsive to driving the antenna element of the antenna assembly in the first electrical configuration. The antenna element of the antenna assembly is driving in the second electrical configuration with the radiofrequency signal to radiate with a polarization predominately in a second direction of propagation, responsive to selectively modifying the antenna assembly from the first electrical configuration to the second electrical configuration.

20 Claims, 7 Drawing Sheets

(56) References Cited

U.S. PATENT DOCUMENTS

| | | | | |
|---|---|---|---|---|
| 2009/0224847 A1* | 9/2009 | Cezanne | ............... | H01Q 3/30 |
| | | | | 333/139 |
| 2009/0251383 A1* | 10/2009 | Tani | ............... | H01Q 1/243 |
| | | | | 343/852 |
| 2010/0171675 A1* | 7/2010 | Borja | ............... | H01Q 1/38 |
| | | | | 343/798 |
| 2011/0032171 A1* | 2/2011 | Tuttle | ............... | H01Q 1/2216 |
| | | | | 343/876 |
| 2014/0176373 A1* | 6/2014 | Crouch | ............... | H01Q 5/35 |
| | | | | 343/703 |
| 2015/0084831 A1* | 3/2015 | Liu | ............... | H01Q 21/24 |
| | | | | 343/893 |
| 2015/0188217 A1* | 7/2015 | Tsai | ............... | H01Q 1/273 |
| | | | | 343/702 |
| 2016/0064830 A1* | 3/2016 | Jervis | ............... | H01Q 21/26 |
| | | | | 343/798 |
| 2017/0117630 A1* | 4/2017 | Lilja | ............... | H01Q 7/00 |
| 2019/0097327 A1* | 3/2019 | Mohamadi | ............ | H01Q 21/24 |

\* cited by examiner

ANTENNA POLARIZATION DIVERSITY

BACKGROUND

In radiofrequency communications, multiple-input and multiple-output (MIMO) describes a method of multiplying the capacity of a communications channel using multiple transmission and receiving antennas to exploit multipath propagation. Physical separation of multiple antennas on a communications device can enhance the performance of transmission and reception when the multiple antennas individually experience different environmental influences. For example, a first antenna may experience interference at its placement in the communications device (e.g., from a user's hand), thereby reducing that antenna's performance, whereas a second antenna is placed far enough from the first antenna that it does not suffer from the same interference, thereby experiencing better performance. In combination, such placement diversity can improve the average communication performance of the communications device over a single antenna system or a multi-antenna system having little separate or orientation diversity.

SUMMARY

The described technology provides antenna polarization diversity to enhance the MIMO performance of multiple antennas, especially when the multiple antennas do not exhibit significant placement diversity. An antenna assembly provides selectable antenna polarization in the antenna assembly on a ground plane. An antenna element of the antenna assembly drives a first electrical configuration with a radiofrequency signal to radiate with a polarization predominately in a first direction of propagation. The antenna assembly is selectively modified from the first electrical configuration to a second electrical configuration, responsive to driving the antenna element of the antenna assembly in the first electrical configuration. The antenna element of the antenna assembly is driving in the second electrical configuration with the radiofrequency signal to radiate with a polarization predominately in a second direction of propagation, responsive to selectively modifying the antenna assembly from the first electrical configuration to the second electrical configuration.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

Other implementations are also described and recited herein.

BRIEF DESCRIPTIONS OF THE DRAWINGS

DETAILED DESCRIPTIONS

As mobile communication devices continue to get smaller and signaling protocols push for smaller and more-tightly packed antennas (e.g., in dense antenna arrays), antenna separation diversity becomes less feasible. For example, in a 5G antenna array, the individual antennas may be packed tightly together, offering little separation among them. Moreover, the real estate available to antennas in the pursuit of smaller devices and smaller display bezels puts additional limitations on antenna separation diversity. Accordingly, these constraints limit the benefits of MIMO performance enhancements.

The described technology provides a communications device capable of dynamically switching the radiofrequency polarization of individual antennas through hardware and/or software control, thereby providing polarization diversity for individual antennas to obtain MIMO performance enhancements, even for antennas with minimal separate diversity.

Figure 1:
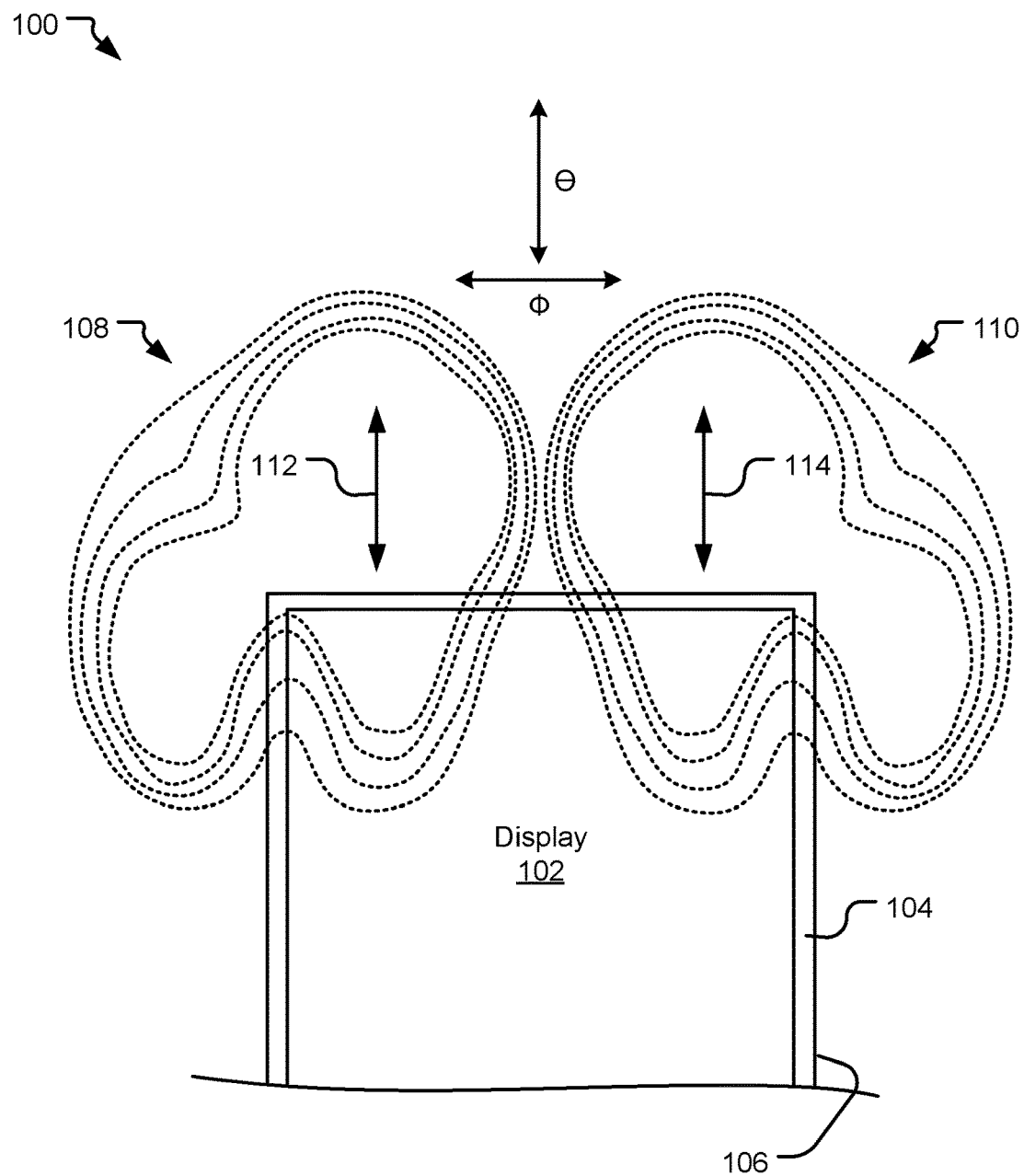
FIG. 1 illustrates an example computing device having an antenna assembly at each of two corners, wherein the antenna assemblies radiate with polarization predominately in the theta axis of polarization.

FIG. 1 illustrates an example computing device 100 having an antenna assembly (not shown in FIG. 1) at each of two corners, wherein the antenna assemblies radiate with polarization predominately in the theta ($\Theta$) axis of polarization (e.g., in a direction of propagation). As shown in FIG. 1, the theta axis extends from top to bottom in the illustrated computing device 100 and is orthogonal to a phi ($\phi$) axis extended laterally from side to side in the illustrated computing device 100. It should be understood that the theta and phi axes are examples of first and second directions of propagation of linear polarization and ground plane current flow, although other directions may also be employed. In various implementations, the first and second directions of propagation may be orthogonal or substantially orthogonal (e.g., within ±1°, ±5°, ±10°).

The computing device 100 includes a display 102, a bezel section 104 positioned about the display 102, and various electronic and mechanical components within the computing device case 106, which is at least partially include a metal or metallic enclosure, although other implementations may be made from other materials. The computing device 100 includes radiofrequency transmitters and receivers, including antenna assemblies at the top corners of the computing device 100, although the placement of antenna assemblies may vary in other implementations.

The dashed contour lines located at each top corner of the computing device 100 represent electric field lines 108 and 110 associated with antenna assemblies at each corner. An antenna assembly includes a transducer that converts radiofrequency electric field current into electromagnetic radiofrequency waves that are radiated into the space around the antenna assembly. The electric field plane determines the polarization or orientation of the electromagnetic radiofrequency waves radiated from the antenna assembly. A linear polarized antenna element of an antenna assembly radiates predominately in one plane along a direction of propagation.

The computing device 100 includes antenna assemblies with switchable electrical configurations, wherein different electrical configurations produce electromagnetic radiofrequency waves that radiate into space predominately in different directions of propagation. Accordingly, in FIG. 1, the electrical configuration of the antenna assembly, as shown later in FIG. 4, induces electromagnetic radiofrequency waves that radiate into space a polarization predominately in the theta direction of propagation, which is illustrated by the arrows 112 and 114 indicated greater propagation along the theta direction of propagation than in any other direction.

Figure 2:
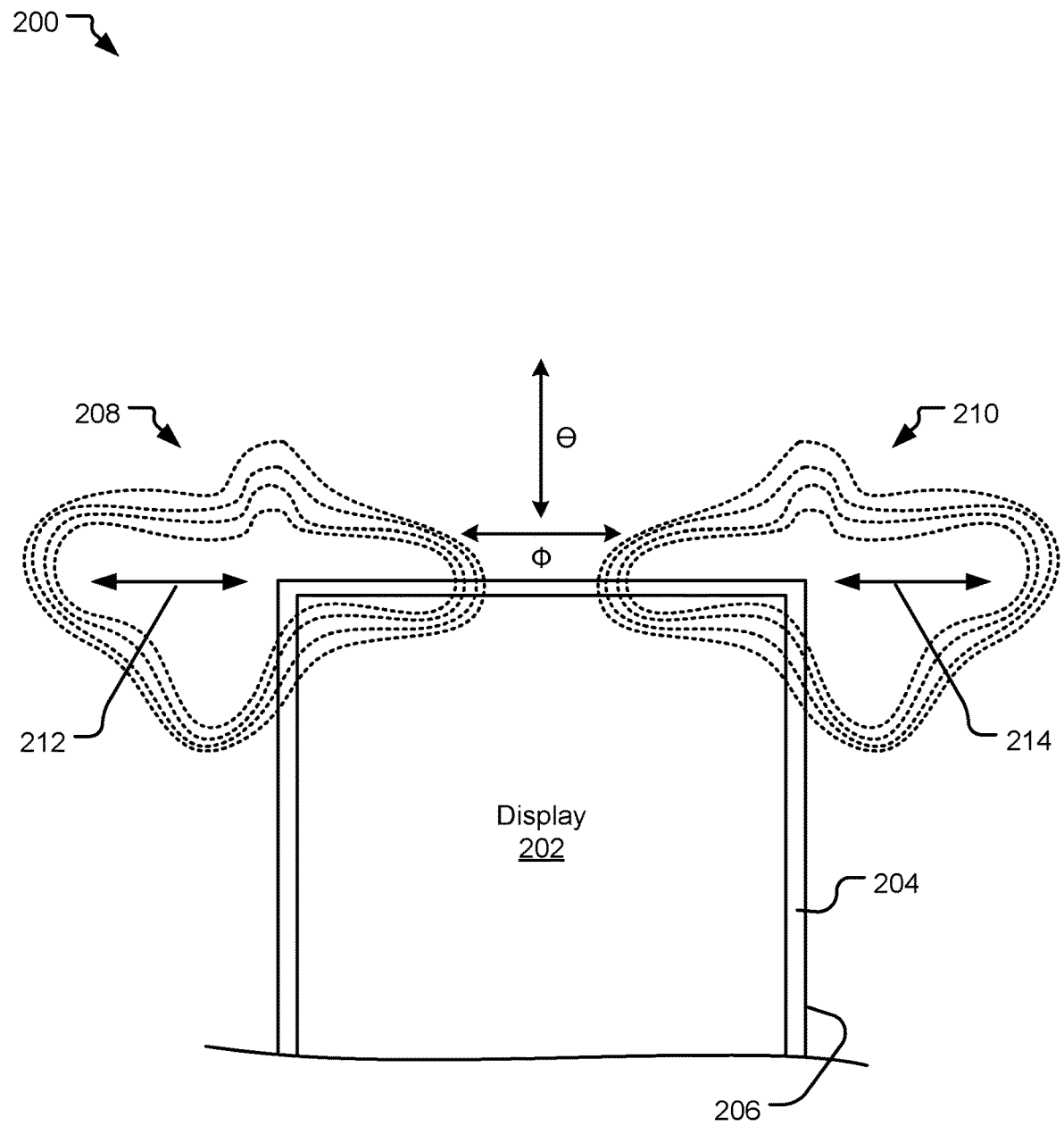
FIG. 2 illustrates an example computing device having an antenna assembly at each of two corners, wherein the antenna assemblies radiate with polarization predominately in the phi axis of polarization.

FIG. 2 illustrates an example computing device 200 having an antenna assembly (not shown in FIG. 2) at each of two corners, wherein the antenna assemblies radiate with polarization predominately in the phi axis of polarization (e.g., in a direction of propagation). As shown in FIG. 2, the phi axis extends from laterally from side-to-side in the illustrated computing device 200 and is orthogonal to a theta axis extended from top to bottom in the illustrated computing device 200. It should be understood that the theta and phi axes are examples of first and second directions of propagation of linear polarization and ground plane current flow, although other directions may also be employed. In various implementations, the first and second directions of propagation may be orthogonal or substantially orthogonal (e.g., within ±1°, ±5°, ±10°).

The computing device 200 includes a display 202, a bezel section 204 positioned about the display 202, and various electronic and mechanical components within the computing device case 206, which is at least partially include a metal or metallic enclosure, although other implementations may be made from other materials. The computing device 200 includes radiofrequency transmitters and receivers, including antenna assemblies at the top corners of the computing device 200, although the placement of antenna assemblies may vary in other implementations.

The dashed contour lines located at each top corner of the computing device 200 represent electric field lines 208 and 210 associated with antenna assemblies at each corner. An antenna assembly includes a transducer that converts radiofrequency electric field current into electromagnetic radiofrequency waves that are radiated into the space around the antenna assembly. The electric field plane determines the polarization or orientation of the electromagnetic radiofrequency waves radiated from the antenna assembly. A linear polarized antenna element of an antenna assembly radiates predominately in one plane along a direction of propagation.

The computing device 200 includes antenna assemblies with switchable electrical configurations, wherein different electrical configurations produce electromagnetic radiofrequency waves that radiate into space predominately in different directions of propagation. Accordingly, in FIG. 2, the electrical configuration of the antenna assembly, as shown later in FIG. 5, induces electromagnetic radiofrequency waves that radiate into space a polarization predominately in the phi direction of propagation, which is illustrated by the arrows 212 and 214 indicated greater propagation along the phi direction of propagation than in any other direction.

Figure 3:
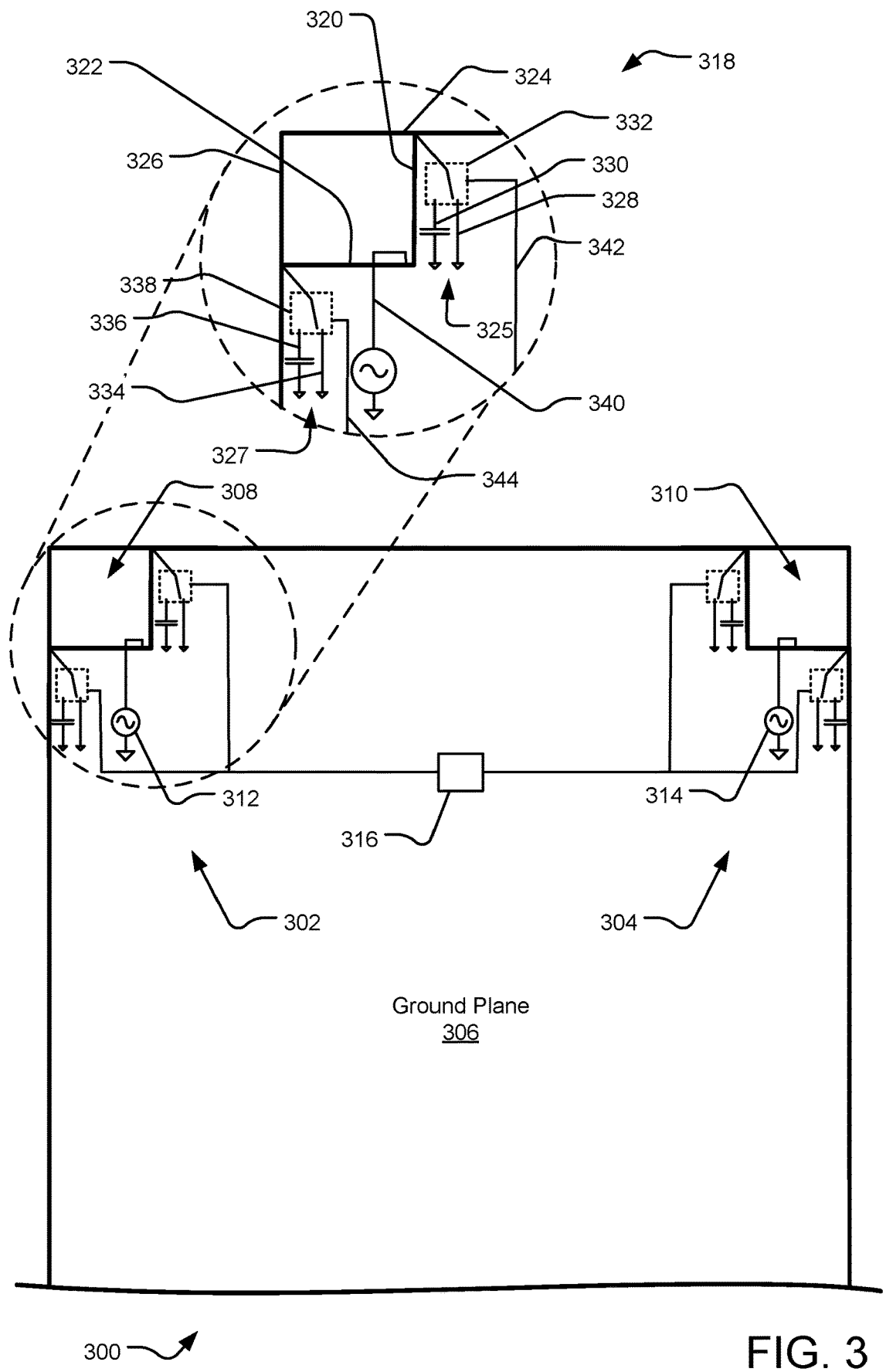
FIG. 3 illustrates an example computing device having antenna assemblies for providing antenna polarization diversity.

FIG. 3 illustrates an example computing device 300 having antenna assemblies 302 and 304 for providing antenna polarization diversity. In the illustrated implementation, the computing device 300 includes a ground plane 306 with corner apertures 308 and 310 (e.g., notches or holes), each corner aperture forming at least a portion of an antenna element. For example, the antenna element can be created from a closed hole cut or otherwise formed into the corner of the ground plane 306, such that the boundaries of the closed hole are part of the ground plane 306. In another implementation, the antenna element can be created from an open notch cut or otherwise formed in the corner of the ground plane 306 with a conductive connector or routing connecting the two outer corners of the notch (e.g., so as to close the loop of a loop antenna), such that some of the boundaries of the resulting aperture are part of the ground plane 306 and other boundaries include one or more separate conductive paths. Other implementations may also be employed.

Each of the illustrated antenna elements forms a loop antenna having notched edges of the ground plane 306 as two segments of the loop, with different segments of the loop tied to ground through a switched path. The combination of multiple loop segments forms a loop antenna for each antenna assembly. A radiofrequency feed (e.g., radiofrequency feeds 312 and 314) is coupled to drive each corresponding antenna element with a radiofrequency signal. Each antenna element is connected to ground via two switched connecting paths of the corner aperture. The switched connecting paths of the antenna assemblies 302 and 304 are controlled by a polarization switch controller 316, which alternately switches between a theta polarization and a phi polarization in each antenna assembly. The polarization switch controller 316 may be controlled via hardware and/or software (e.g., antenna firmware).

A blowout rendering of the left antenna assembly 302 is shown at blowout 318, although the structural and functional details described with regard to the blowout 318 can apply to either antenna assembly. In the illustrated embodiment, ground plane edges 320 and 322 form two segments of the loop antenna element, with conductive connectors forming additional segments 324 and 326 between the ground plane notch corners. Each ground plane notch corner is connected to ground through switched connecting paths 325 and 327. The switched connecting path 325 includes a shorted connector path 328 and a capacitor path 330, between which a selector (e.g., a switch 332) selects one path or the other. The switched connecting path 327 includes a shorted connector path 334 and a capacitor path 336, between which a selector (e.g., a switch 338) selects one path or the other. It should be understood that multiple capacitor paths with different capacitance values may also be implemented using similar selector circuits.

A feed line 340 electrically drives the loop antenna from the radiofrequency feed 312. The control lines 342 and 344 control the switches 332 and 338 respectively from the polarization switch controller 316. When the switches 332 and 338 are switched to connect the top segment of the loop antenna through the capacitor path 330 to ground and the side segment of the loop antenna through the shorted connector path 334 to ground, radiofrequency electric field current from the radiofrequency feed 312 is induced predominately in the phi direction of current propagation in the ground plane, thereby inducing a predominately theta axis polarization in the resulting electromagnetic radiofrequency (as shown in FIG. 1). When the switches 332 and 338 are switched to connect the side segment of the loop antenna through the capacitor path 336 to ground and the top segment of the loop antenna through the shorted connector path 328 to ground, radiofrequency electric field current from the radiofrequency feed 312 is induced predominately in the theta direction of current propagation in the ground plane, thereby inducing a predominately phi axis polarization in the resulting electromagnetic radiofrequency (as shown in FIG. 2).

Figure 4:
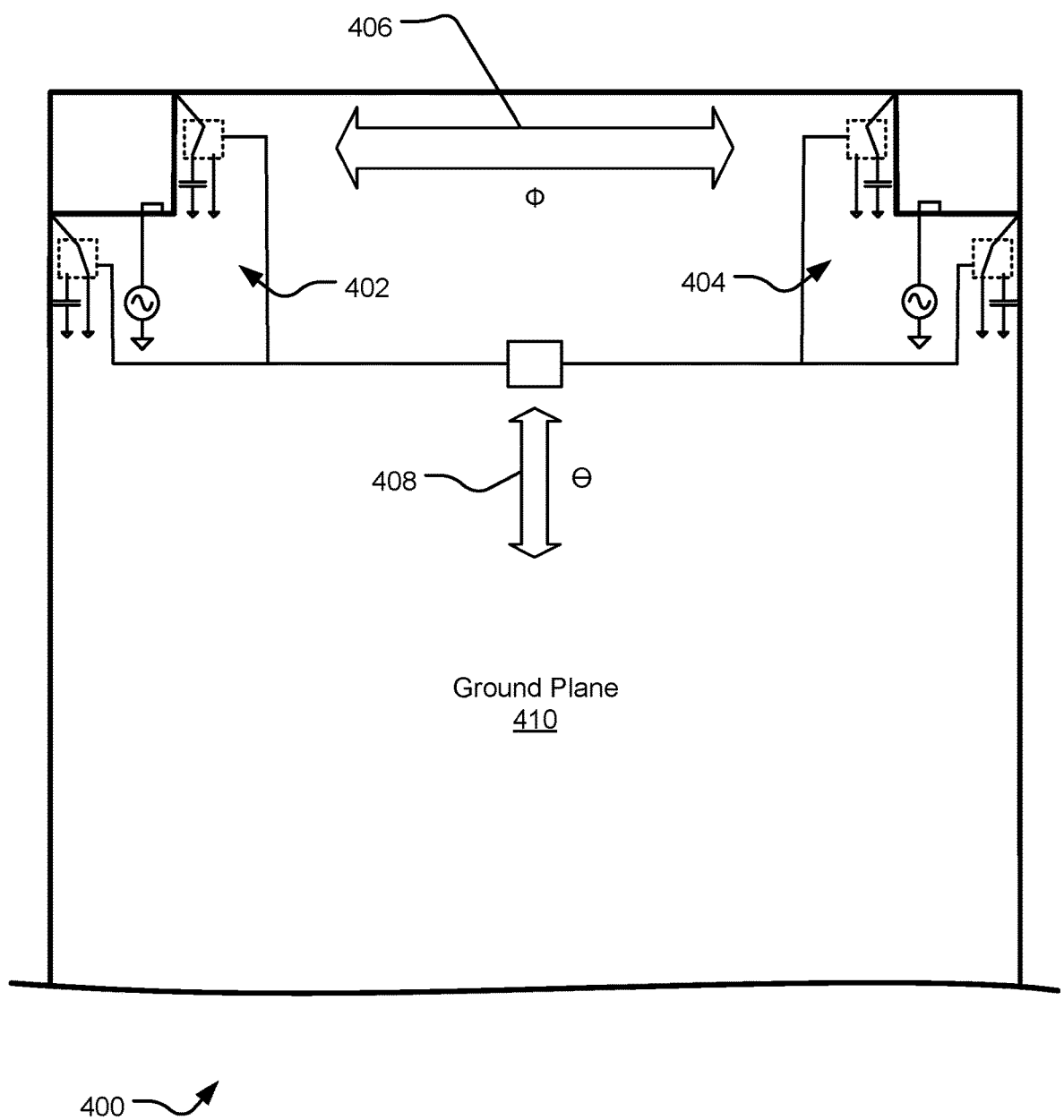
FIG. 4 illustrates an example computing device having antenna assemblies configured to provide polarization predominately in the theta axis of polarization.

FIG. 4 illustrates an example computing device 400 having antenna assemblies 402 and 404 configured to provide polarization predominately in the theta axis of polarization. When the antennas assemblies 402 and 404 are switched to connect the top segment of the loop antennas through the capacitor path to ground and the side segment of the loop antenna through the shorted connector paths to ground, radiofrequency electric field current from the radiofrequency feed is induced predominately (as illustrated by the larger phi arrow 406 as compared to the smaller theta arrow 408) in the phi direction of current propagation in the ground plane 410, thereby inducing a predominately theta axis polarization in the resulting electromagnetic radiofrequency (as shown in FIG. 1).

Figure 5:
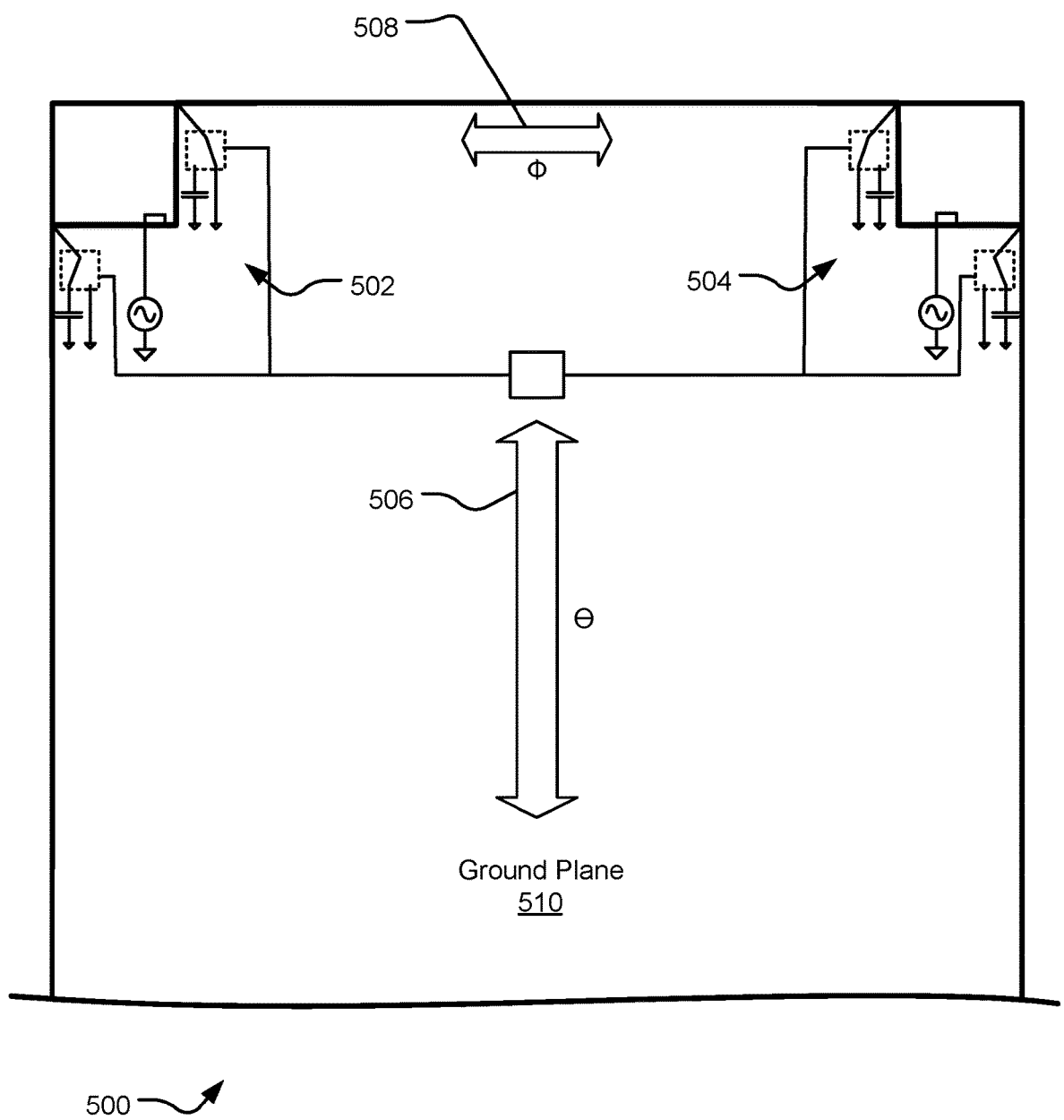
FIG. 5 illustrates an example computing device having antenna assemblies configured to provide polarization predominately in the phi axis of polarization.

FIG. 5 illustrates an example computing device 500 having antenna assemblies 502 and 504 configured to provide polarization predominately in the phi axis of polarization. When the antennas assemblies 502 and 504 are switched to connect the side segment of the loop antenna through the capacitor paths top ground and the top segment of the loop antenna through the shorted connector paths to ground, radiofrequency electric field current from the radiofrequency feed is induced predominately (as illustrated by the larger theta arrow 506 as compared to the smaller phi arrow 508) in the theta direction of current propagation in the ground plane 510, thereby inducing a predominately phi axis polarization in the resulting electromagnetic radiofrequency (as shown in FIG. 2).

Figure 6:
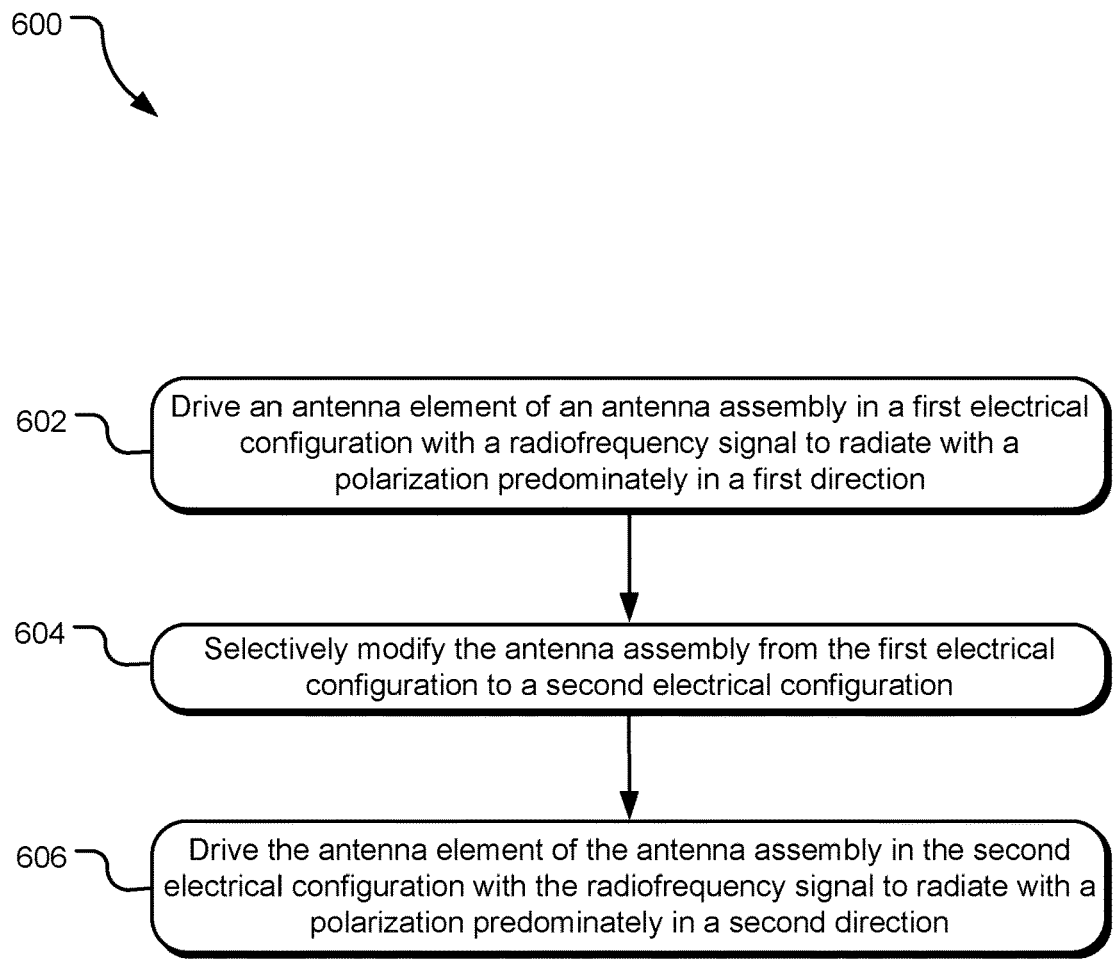
FIG. 6 illustrates example operations for providing antenna polarization diversity.

FIG. 6 illustrates example operations 600 for providing antenna polarization diversity. A driving operation 602 drives an antenna element of an antenna assembly in a first electrical configuration with a radiofrequency signal to radiate with a polarization predominately in a first direction of propagation. For example, if the first electrical configuration connects the top segment of the loop antenna through the capacitor paths to ground and the side segment of the loop antenna through the shorted connector paths to ground, radiofrequency electric field current from the radiofrequency feed is induced predominately in the phi direction of current propagation in the ground plane, thereby inducing a predominately theta axis polarization in the resulting electromagnetic radiofrequency (as shown in FIG. 1). In contrast, if the first electrical configuration connects the side segment of the loop antenna through the capacitor paths to ground and the top segment of the loop antenna through the shorted connector paths to ground, radiofrequency electric field current from the radiofrequency feed is induced predominately in the theta direction of current propagation in the ground plane, thereby inducing a predominately phi axis polarization in the resulting electromagnetic radiofrequency (as shown in FIG. 2).

A selective modification operation 604 modifies the antenna assembly from the first electrical configuration to a second electrical configuration, such as controlled by a polarization switch controller connected to selectors. The selective modification operation 604 can be repeated between each electrical configuration to alternate antenna polarization.

Another driving operation 606 drives the antenna element of the antenna assembly in the second electrical configuration with the same radiofrequency signal to radiate with a polarization predominately in a second direction of propagation. For example, if the second electrical configuration connects the side segments of the loop antennas through the capacitor paths to ground and the top segments of the loop antennas through the shorted connector paths to ground, radiofrequency electric field current from the radiofrequency feed is induced predominately in the theta direction of current propagation in the ground plane, thereby inducing a predominately phi axis polarization in the resulting electromagnetic radiofrequency (as shown in FIG. 2). In contrast, if the second electrical configuration connects the top segments of the loop antennas through the capacitor paths to ground and the side segment of the loop antenna through the shorted connector paths to ground, radiofrequency electric field current from the radiofrequency feed is induced predominately in the phi direction of current propagation in the ground plane, thereby inducing a predominately theta axis polarization in the resulting electromagnetic radiofrequency (as shown in FIG. 1).

Figure 7:
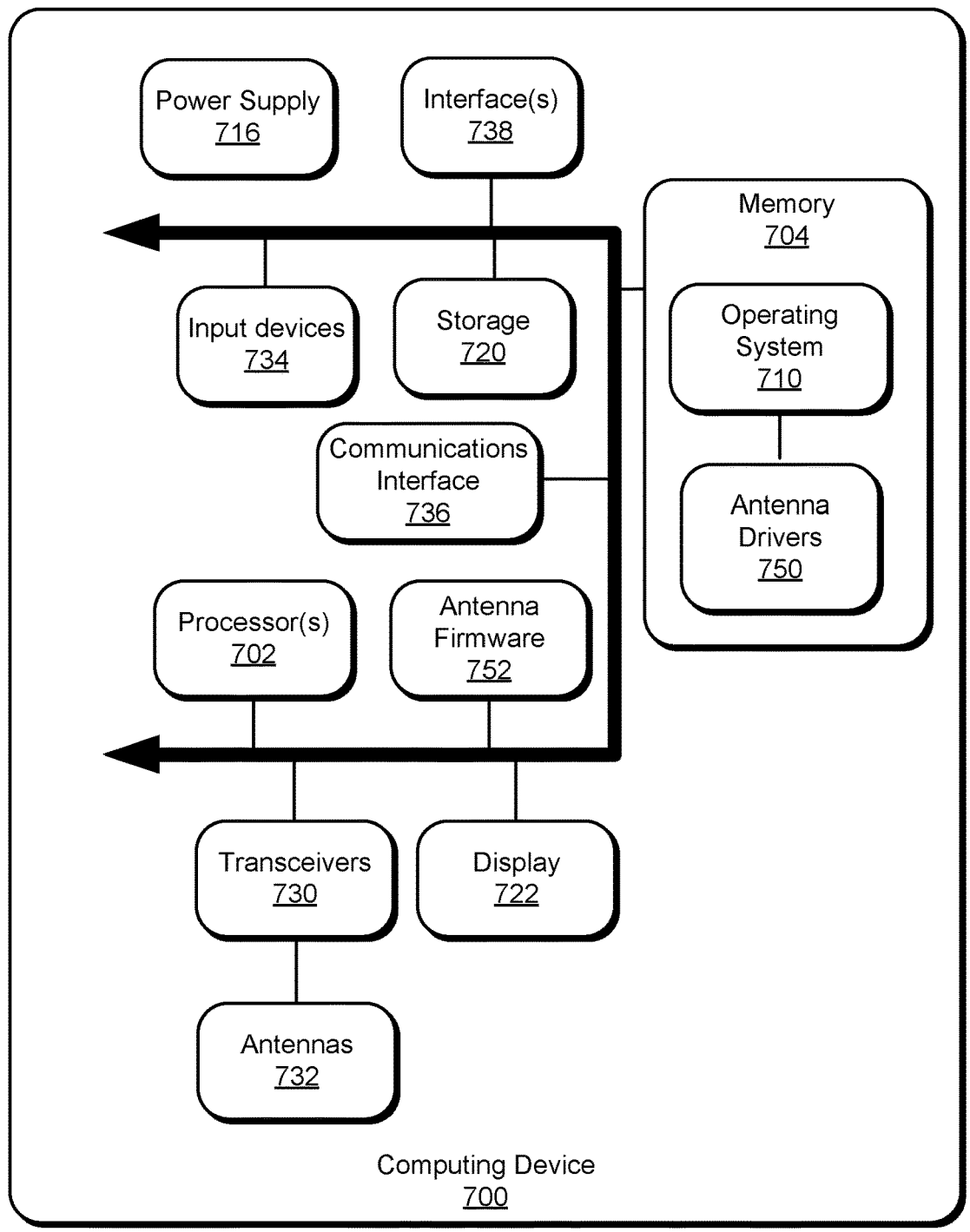
FIG. 7 illustrates an example computing device for use in providing antenna polarization diversity.

FIG. 7 illustrates an example computing device 700 for use in providing antenna polarization diversity. The computing device 700 may be a client device, such as a laptop, mobile device, desktop, tablet, or a server/cloud device. The computing device 700 includes one or more processor(s) 702, and a memory 704. The memory 704 generally includes both volatile memory (e.g., RAM) and non-volatile memory (e.g., flash memory). An operating system 710 resides in the memory 704 and is executed by the processor(s) 702.

In an example computing device 700, as shown in FIG. 7, one or more modules or segments, such as antenna drivers 750, application modules, and other modules, are loaded into the operating system 710 on the memory 704 and/or storage 720 and executed by processor(s) 702. The storage 720 may be stored wireless communications parameters, drivers, and other data and be local to the computing device 700 or may be remote and communicatively connected to the computing device 700.

The computing device 700 includes a power supply 716, which is powered by one or more batteries or other power sources and which provides power to other components of the computing device 700. The power supply 716 may also be connected to an external power source that overrides or recharges the built-in batteries or other power sources.

The computing device 700 may include one or more communication transceivers 730 which may be connected to one or more antenna(s) 732 to provide network connectivity (e.g., mobile phone network, Wi-Fi®, Bluetooth®) to one or more other servers and/or client devices (e.g., mobile devices, desktop computers, or laptop computers). The computing device 700 may further include a network adapter 736, which is a type of communication device. The computing device 700 may use the adapter and any other types of communication devices for establishing connections over a wide-area network (WAN) or local-area network (LAN). It should be appreciated that the network connections shown are exemplary and that other communications devices and means for establishing a communications link between the computing device 700 and other devices may be used.

The computing device 700 may include one or more input devices 734 such that a user may enter commands and information (e.g., a keyboard or mouse). These and other input devices may be coupled to the server by one or more interfaces 738 such as a serial port interface, parallel port, or universal serial bus (USB). The computing device 700 may further include a display 722, such as a touch screen display.

The computing device 700 may include a variety of tangible processor-readable storage media and intangible processor-readable communication signals. Tangible processor-readable storage can be embodied by any available media that can be accessed by the computing device 700 and includes both volatile and nonvolatile storage media, removable and non-removable storage media. Tangible processor-readable storage media excludes intangible communications signals and includes volatile and nonvolatile, removable and non-removable storage media implemented in any method or technology for storage of information such as processor-readable instructions, data structures, program modules or other data. Tangible processor-readable storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other tangible medium which can be used to store the desired information and which can be accessed by the computing device 700. In contrast to tangible processor-readable storage media, intangible processor-readable communication signals may embody processor-readable instructions, data structures, program modules or other data resident in a modulated data signal, such as a carrier wave or other signal transport mechanism. The term "modulated data signal" means a signal that has one or more of its characteristics set or changed in such a manner as to encode information in the signal. By way of example, and not limitation, intangible communication signals include signals traveling through wired media such as a wired network or direct-wired connection, and wireless media such as acoustic, RF, infrared, and other wireless media.

An example method of providing selectable antenna polarization in an antenna assembly on a ground plane is provided. The example method includes driving an antenna element of the antenna assembly in a first electrical configuration with a radiofrequency signal to radiate with a polarization predominately in a first direction of propagation, selectively modifying the antenna assembly from the first electrical configuration to a second electrical configuration, responsive to driving the antenna element of the antenna assembly in the first electrical configuration, and driving the antenna element of the antenna assembly in the second electrical configuration with the radiofrequency signal to radiate with a polarization predominately in a second direction of propagation, responsive to selectively modifying the antenna assembly from the first electrical configuration to the second electrical configuration.

Another example method of any preceding method is provided wherein driving the antenna element of the antenna assembly in the first electrical configuration with the radiofrequency signal induces current flow in the ground plane predominately in the second direction of propagation.

Another example method of any preceding method is provided wherein driving the antenna element of the antenna assembly in the second electrical configuration with the radiofrequency signal induces current flow in the ground plane predominately in the first direction of propagation.

Another example method of any preceding method is provided wherein the first direction of propagation and the second direction of propagation are substantially orthogonal to each other.

Another example method of any preceding method is provided wherein the antenna element includes a loop antenna, formed at least in part from a corner notch in a ground plane.

Another example method of any preceding method is provided wherein the antenna element includes a loop antenna having at least two loop segments including at least a first loop segment aligned with the first direction of propagation and at least a second loop segment aligned with the second direction of propagation.

Another example method of any preceding method is provided wherein the antenna assembly includes having at least two switches, a first switch of the two switches being configured to switch a switched connecting path connected to the first loop segment between a capacitor path to ground and a shorted connection path to ground, a second switch of the two switches being configured to switch a switched connecting path connected to the first loop segment between a capacitor path to ground and a shorted connection path to ground.

An example computing device includes a ground plane, an antenna element at least partially formed in the ground plane, a radiofrequency feed coupled to drive the antenna element with a radiofrequency signal, and at least one selector configured to select between a first electrical configuration and a second electrical configuration in the antenna element, wherein the first electrical configuration induces the radiofrequency signal to drive the antenna element to radiate with a polarization predominately in a first direction of propagation and the second electrical configuration induces the radiofrequency signal to drive the antenna element to radiate with a polarization predominately in a second direction of propagation.

Another computing device of any preceding computing device is provided wherein the at least one selector is switchable to induce current flow in the ground plane predominately in the first direction of propagation and in the second direction of propagation.

Another computing device of any preceding computing device is provided wherein the first direction of propagation and the second direction of propagation are substantially orthogonal to each other.

Another computing device of any preceding computing device is provided wherein the antenna element includes a loop antenna.

Another computing device of any preceding computing device is provided wherein the antenna element includes a corner notch in a ground plane, the corner notch forming a portion of a loop antenna.

Another computing device of any preceding computing device is provided wherein the antenna element includes a loop antenna having at least two loop segments including at least a first loop segment aligned with the first direction of propagation and at least a second loop segment aligned with the second direction of propagation.

Another computing device of any preceding computing device is provided wherein the at least one selector includes at least two switches, a first switch of the two switches being configured to switch a switched connecting path connected to the first loop segment between a capacitor path to ground and a shorted connection path to ground, a second switch of the two switches being configured to switch a switched connecting path connected to the first loop segment between a capacitor path to ground and a shorted connection path to ground.

One or more example tangible processor-readable storage media embodied with instructions for executing on one or more processors and circuits of a computing device provides a process for switching antenna polarization in an antenna assembly on a ground plane. The process includes driving an antenna element of the antenna assembly in a first electrical configuration with a radiofrequency signal to radiate with a polarization predominately in a first direction of propagation, selectively modifying the antenna assembly from the first electrical configuration to a second electrical configuration, responsive to driving the antenna element of the antenna assembly in the first electrical configuration, and driving the antenna element of the antenna assembly in the second electrical configuration with the radiofrequency signal to radiate with a polarization predominately in a second direction of propagation, responsive to selectively modifying the antenna assembly from the first electrical configuration to the second electrical configuration.

Another one or more tangible processor-readable storage media of any preceding media is provided wherein driving the antenna element of the antenna assembly in the first electrical configuration with the radiofrequency signal induces current flow in the ground plane predominately in the second direction of propagation.

Another one or more tangible processor-readable storage media of any preceding media is provided wherein driving the antenna element of the antenna assembly in the second electrical configuration with the radiofrequency signal induces current flow in the ground plane predominately in the first direction of propagation.

Another one or more tangible processor-readable storage media of any preceding media is provided wherein the first direction of propagation and the second direction of propagation are substantially orthogonal to each other.

Another one or more tangible processor-readable storage media of any preceding media is provided wherein the antenna element includes a loop antenna having at least two loop segments including at least a first loop segment aligned with the first direction of propagation and at least a second loop segment aligned with the second direction of propagation.

Another one or more tangible processor-readable storage media of any preceding media is provided wherein the antenna assembly includes having at least two switches, a first switch of the two switches being configured to switch a switched connecting path connected to the first loop segment between a capacitor path to ground and a shorted connection path to ground, a second switch of the two switches being configured to switch a switched connecting path connected to the first loop segment between a capacitor path to ground and a shorted connection path to ground.

An example system of providing selectable antenna polarization in an antenna assembly on a ground plane is provided. The example system includes means for driving an antenna element of the antenna assembly in a first electrical configuration with a radiofrequency signal to radiate with a polarization predominately in a first direction of propagation, means for selectively modifying the antenna assembly from the first electrical configuration to a second electrical configuration, responsive to the driving of the antenna element of the antenna assembly in the first electrical configuration, and means for driving the antenna element of the antenna assembly in the second electrical configuration with the radiofrequency signal to radiate with a polarization predominately in a second direction of propagation, responsive to selectively modification the antenna assembly from the first electrical configuration to the second electrical configuration.

Another example system of any preceding system is provided wherein means for driving the antenna element of the antenna assembly in the first electrical configuration with the radiofrequency signal induces current flow in the ground plane predominately in the second direction of propagation.

Another example system of any preceding system is provided wherein means for driving the antenna element of the antenna assembly in the second electrical configuration with the radiofrequency signal induces current flow in the ground plane predominately in the first direction of propagation.

Another example system of any preceding system is provided wherein the first direction of propagation and the second direction of propagation are substantially orthogonal to each other.

Another example system of any preceding system is provided wherein the antenna element includes a loop antenna, formed at least in part from a corner notch in a ground plane.

Another example system of any preceding system is provided wherein the antenna element includes a loop antenna having at least two loop segments including at least a first loop segment aligned with the first direction of propagation and at least a second loop segment aligned with the second direction of propagation.

Another example system of any preceding system is provided wherein the antenna assembly includes having at least two switches, a first switch of the two switches being configured to switch a switched connecting path connected to the first loop segment between a capacitor path to ground and a shorted connection path to ground, a second switch of the two switches being configured to switch a switched connecting path connected to the first loop segment between a capacitor path to ground and a shorted connection path to ground.

Some implementations may comprise an article of manufacture. An article of manufacture may comprise a tangible storage medium to store logic. Examples of a storage medium may include one or more types of computer-readable storage media capable of storing electronic data, including volatile memory or non-volatile memory, removable or non-removable memory, erasable or non-erasable memory, writeable or re-writeable memory, and so forth. Examples of the logic may include various software elements, such as software components, programs, applications, computer programs, application programs, system programs, machine programs, operating system software, middleware, firmware (including antenna firmware 752), software modules, routines, subroutines, operation segments, methods, procedures, software interfaces, application program interfaces (API), instruction sets, computing code, computer code, code segments, computer code segments, words, values, symbols, or any combination thereof. In one implementation, for example, an article of manufacture may store executable computer program instructions that, when executed by a computer, cause the computer to perform methods and/or operations in accordance with the described embodiments. The executable computer program instructions may include any suitable type of code, such as source code, compiled code, interpreted code, executable code, static code, dynamic code, and the like. The executable computer program instructions may be implemented according to a predefined computer language, manner or syntax, for instructing a computer to perform a certain operation segment. The instructions may be implemented using any suitable high-level, low-level, object-oriented, visual, compiled and/or interpreted programming language.

The implementations described herein are implemented as logical steps in one or more computer systems. The logical operations may be implemented (1) as a sequence of processor-implemented steps executing in one or more computer systems and (2) as interconnected machine or circuit modules within one or more computer systems. The implementation is a matter of choice, dependent on the performance requirements of the computer system being utilized.

Accordingly, the logical operations making up the implementations described herein are referred to variously as operations, steps, objects, or modules. Furthermore, it should be understood that logical operations may be performed in any order, unless explicitly claimed otherwise or a specific order is inherently necessitated by the claim language.

What is claimed is:

1. A method of providing selectable antenna polarization in an antenna assembly on a ground plane, the method comprising:
   driving an antenna element of the antenna assembly in a first electrical configuration with a radiofrequency signal to radiate with a polarization predominately in a first direction of propagation, the antenna element being at least partially formed in the ground plane with at least one edge of the ground plane forming a segment of an antenna of the antenna element;
   selectively modifying the antenna assembly from the first electrical configuration to a second electrical configuration, responsive to driving the antenna element of the antenna assembly in the first electrical configuration; and
   driving the antenna element of the antenna assembly in the second electrical configuration with the radiofrequency signal to radiate with a polarization predominately in a second direction of propagation, responsive to selectively modifying the antenna assembly from the first electrical configuration to the second electrical configuration.

2. The method of claim 1 wherein driving the antenna element of the antenna assembly in the first electrical configuration with the radiofrequency signal induces current flow in the ground plane predominately in the second direction of propagation.

3. The method of claim 1 wherein driving the antenna element of the antenna assembly in the second electrical configuration with the radiofrequency signal induces current flow in the ground plane predominately in the first direction of propagation.

4. The method of claim 1 wherein the first direction of propagation and the second direction of propagation are substantially orthogonal to each other.

5. The method of claim 1 wherein the antenna element includes a loop antenna formed at least in part from a corner notch in the ground plane.

6. The method of claim 1 wherein the antenna element includes a loop antenna having at least two loop segments including at least a first loop segment aligned with the first direction of propagation and at least a second loop segment aligned with the second direction of propagation.

7. The method of claim 6 wherein the antenna assembly includes having at least two switches, a first switch of the two switches being configured to switch a switched connecting path connected to the first loop segment between a capacitor path to ground and a shorted connection path to ground, a second switch of the two switches being configured to switch a switched connecting path connected to the first loop segment between a capacitor path to ground and a shorted connection path to ground.

8. A computing device comprising:
   a ground plane;
   an antenna element at least partially formed in the ground plane with at least one edge of the ground plane forming a segment of an antenna of the antenna element;
   a radiofrequency feed coupled to drive the antenna element with a radiofrequency signal; and
   at least one selector configured to select between a first electrical configuration and a second electrical configuration in the antenna element, wherein the first electrical configuration induces the radiofrequency signal to drive the antenna element to radiate with a polarization predominately in a first direction of propagation and the second electrical configuration induces the radiofrequency signal to drive the antenna element to radiate with a polarization predominately in a second direction of propagation.

9. The computing device of claim 8 wherein the at least one selector is switchable to induce current flow in the ground plane predominately in the first direction of propagation and in the second direction of propagation.

10. The computing device of claim 8 wherein the first direction of propagation and the second direction of propagation are substantially orthogonal to each other.

11. The computing device of claim 8 wherein the antenna element includes a loop antenna.

12. The computing device of claim 8 wherein the antenna element includes a corner notch in the ground plane, the corner notch forming a segment of a loop antenna.

13. The computing device of claim 8 wherein the antenna element includes a loop antenna having at least two loop segments including at least a first loop segment aligned with the first direction of propagation and at least a second loop segment aligned with the second direction of propagation.

14. The computing device of claim 13 wherein the at least one selector includes at least two switches, a first switch of the two switches being configured to switch a switched connecting path connected to the first loop segment between a capacitor path to ground and a shorted connection path to ground, a second switch of the two switches being configured to switch a switched connecting path connected to the first loop segment between a capacitor path to ground and a shorted connection path to ground.

15. One or more tangible processor-readable storage media embodied with instructions for executing on one or more processors and circuits of a computing device a process for switching antenna polarization in an antenna assembly on a ground plane, the process comprising:
   driving an antenna element of the antenna assembly in a first electrical configuration with a radiofrequency signal to radiate with a polarization predominately in a first direction of propagation, the antenna element being at least partially formed in the ground plane, at least one edge of the ground plane forming a segment of an antenna of the antenna element;
   selectively modifying the antenna assembly from the first electrical configuration to a second electrical configuration, responsive to driving the antenna element of the antenna assembly in the first electrical configuration; and
   driving the antenna element of the antenna assembly in the second electrical configuration with the radiofrequency signal to radiate with a polarization predominately in a second direction of propagation, responsive to selectively modifying the antenna assembly from the first electrical configuration to the second electrical configuration.

16. The one or more tangible processor-readable storage media of claim 15 wherein driving the antenna element of the antenna assembly in the first electrical configuration with the radiofrequency signal induces current flow in the ground plane predominately in the second direction of propagation.

17. The one or more tangible processor-readable storage media of claim 15 wherein driving the antenna element of the antenna assembly in the second electrical configuration with the radiofrequency signal induces current flow in the ground plane predominately in the first direction of propagation.

18. The one or more tangible processor-readable storage media of claim 15 wherein the first direction of propagation and the second direction of propagation are substantially orthogonal to each other.

19. The one or more tangible processor-readable storage media of claim 15 wherein the antenna element includes a loop antenna having at least two loop segments including at least a first loop segment aligned with the first direction of propagation and at least a second loop segment aligned with the second direction of propagation.

20. The one or more tangible processor-readable storage media of claim 19 wherein the antenna assembly includes having at least two switches, a first switch of the two switches being configured to switch a switched connecting path connected to the first loop segment between a capacitor path to ground and a shorted connection path to ground, a second switch of the two switches being configured to switch a switched connecting path connected to the first loop segment between a capacitor path to ground and a shorted connection path to ground.

* * * * *